US010973285B2

(12) United States Patent
Lukens et al.

(10) Patent No.: US 10,973,285 B2
(45) Date of Patent: Apr. 13, 2021

(54) ATTACHMENT SYSTEM FOR WATCHBAND

(71) Applicant: Apple Inc., Cupertino, CA (US)

(72) Inventors: William C. Lukens, San Francisco, CA (US); Colin M. Ely, Sunnyvale, CA (US); Adam T. Clavelle, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 131 days.

(21) Appl. No.: 15/986,540

(22) Filed: May 22, 2018

(65) Prior Publication Data

US 2018/0343986 A1 Dec. 6, 2018

Related U.S. Application Data

(60) Provisional application No. 62/516,043, filed on Jun. 6, 2017.

(51) Int. Cl.
*G04B 37/14* (2006.01)
*A44C 5/14* (2006.01)
*G06F 1/16* (2006.01)

(52) U.S. Cl.
CPC .......... *A44C 5/147* (2013.01); *G04B 37/1486* (2013.01); *G06F 1/163* (2013.01)

(58) Field of Classification Search
CPC ...... G04B 37/14; G04B 37/1486; A44C 5/18; A44C 5/185; A44C 5/14; A44C 5/147; Y10T 24/4782; G06F 1/163
USPC ................................................. 224/152, 164
See application file for complete search history.

(56) References Cited

U.S. PATENT DOCUMENTS

| 4,170,104 | A | * | 10/1979 | Yamagata | G04B 37/106 |
| | | | | | 368/289 |
| 4,432,655 | A | * | 2/1984 | Wollman | G04B 37/1486 |
| | | | | | 224/164 |
| 7,401,975 | B2 | * | 7/2008 | Hiranuma | G04B 3/043 |
| | | | | | 368/308 |
| 7,526,840 | B2 | * | 5/2009 | Pernu | A44C 5/14 |
| | | | | | 24/265 WS |

(Continued)

FOREIGN PATENT DOCUMENTS

| CN | 203986448 | 12/2014 |
| CN | 204537389 | 8/2015 |

(Continued)

OTHER PUBLICATIONS

Taper—google.com—Jan. 3, 2020.*

(Continued)

*Primary Examiner* — Sean Kayes
(74) *Attorney, Agent, or Firm* — Morgan, Lewis & Bockius LLP

(57) ABSTRACT

Wearable electronic devices, such as watches, can be provided with an attachment system for connecting and releasing a removable module that interfaces with some portion of the electronic device. For example, a watch housing includes a main body having a channel for receiving a watchband and a first opening extending to the channel. A rear cover coupled to the main body provides a second opening. A unibody button is positioned between the main body and the rear cover. The button is biased against the rear cover and is moveable toward the channel to release a watchband engaged therein.

18 Claims, 5 Drawing Sheets

(56) References Cited

U.S. PATENT DOCUMENTS

| | | | | |
|---|---|---|---|---|
| 9,010,593 | B2* | 4/2015 | Tschumi | G04B 37/1486 224/164 |
| 2001/0016971 | A1* | 8/2001 | Guyard | G04B 37/1486 24/365 |
| 2005/0217080 | A1* | 10/2005 | Kojoori | A44C 5/14 24/265 WS |
| 2005/0265132 | A1* | 12/2005 | Ho | G04B 37/1486 368/282 |
| 2014/0353349 | A1* | 12/2014 | De Oliveira | A44C 5/14 224/164 |
| 2016/0037876 | A1* | 2/2016 | Perkins | A44C 5/2085 224/164 |
| 2016/0037877 | A1* | 2/2016 | Perkins | A44C 5/14 224/164 |
| 2016/0040698 | A1 | 2/2016 | Perkins | |
| 2016/0058375 | A1* | 3/2016 | Rothkopf | G06F 1/1643 600/301 |
| 2016/0069371 | A1* | 3/2016 | Chen | A44B 11/263 403/326 |
| 2016/0378070 | A1 | 12/2016 | Rothkopf | |
| 2017/0045910 | A1* | 2/2017 | Lee | G06F 1/1633 |
| 2017/0181510 | A1* | 6/2017 | Novak | A44C 5/185 |

FOREIGN PATENT DOCUMENTS

| | | |
|---|---|---|
| CN | 105423088 | 3/2016 |
| CN | 206039154 | 3/2017 |
| CN | 106605178 | 4/2017 |
| WO | WO 2012/096634 | 7/2012 |
| WO | WO 2016/025347 | 2/2016 |

OTHER PUBLICATIONS

Flange—google.com—Jan. 3, 2020.*
International Search Report and Written Opinion from PCT/US2018/033895, dated Oct. 25, 2018, 15 pages.
Australian Examination Report from Australian Patent Application No. 2018279897, dated Oct. 16, 2019, 3 pages.
European Office Action from European Patent Application No. 18769847.7, dated Feb. 26, 2020, 7 pages.
Korean Office Action from Korean Patent Application No. 10-2019-7010813, dated Feb. 25, 2020, 9 pages including English language translation.
Summons to Attend Oral Proceedings from European Patent Application No. 18769847.7, dated Aug. 17, 2020, 10 pages.
Japanese Office Action from Japanese Patent Application No. 2019-520396, dated Jun. 5, 2020, 10 pages including English language translation.
Australian Notice of Acceptance dated Sep. 15, 2020, 3 pages.
Korean Office Action from Korean Patent Application No. 10-2019-7010813, dated Oct. 30, 2020, 12 pages including English language translation.
Indian Office Action from Indian Patent Application No. 201917014121, dated Feb. 4, 2021, 6 pages.

* cited by examiner

ATTACHMENT SYSTEM FOR WATCHBAND

CROSS-REFERENCE TO RELATED APPLICATIONS

This application claims the benefit of U.S. Provisional Application No. 62/516,043, entitled "ATTACHMENT SYSTEM FOR WATCHBAND," filed Jun. 6, 2017, the entirety of which is incorporated herein by reference.

TECHNICAL FIELD

The present description relates generally to securement of wearable devices, and, more particularly, to attachment systems for watchbands.

BACKGROUND

Some electronic devices may be removably attached to a user. For example, a wristwatch or fitness/health tracking device can be attached to a user's wrist by joining free ends of a watchband together. In many cases, watchbands may have limited fit adjustment increments available. For example, some bands have an incrementally user-adjustable size (e.g., a buckling clasp, pin and eyelet, etc.) whereas other bands have a substantially fixed size, adjustable only with specialized tools and/or expertise (e.g., folding clasp, deployment clasp, snap-fit clasp, etc.). Other bands may be elasticated expansion-type bands that stretch to fit around a user's wrist. The degree of comfort and securement of the electronic device to the user can depend on the function and arrangement of the watchband.

Consumer products such as watches, cameras, phones, purses, and glasses may include one or more accessories attached thereto. The manner in which they are attached may be widely varied. However, they typically suffer from similar, if not the same, drawbacks. For example, many consumer products typically do not include user-friendly attachment systems. Some may require special tools and others may even require taking the consumer product into a shop in order to remove, fix or replace the accessories. Furthermore, even when products have user oriented attachment mechanisms, they may not provide adequate retention force. Even if the retention force is adequate, the mechanism used may be quite robust and large thereby adversely affecting the elegance of the consumer product.

In one example, wristwatches typically include a case and a band. The case carries the components or mechanisms of the wristwatch including the face. The band extends away from the case so that it can wrap around the wrist of a user. The band may be integral with the case. However, in most cases, the band is a separate part that is attached to the case. For example, the case may include a pin that captures the band thereby attaching the band to the case. In order to detach the band from the case, the pin needs to be removed. In some instances, band removal can be accomplished with a special tool. However, in many cases, the user may need to visit a specialty store or have the assistance of technician in order to remove the band.

BRIEF DESCRIPTION OF THE DRAWINGS

Certain features of the subject technology are set forth in the appended claims. However, for purpose of explanation, several embodiments of the subject technology are set forth in the following figures.

DETAILED DESCRIPTION

Figure 1:
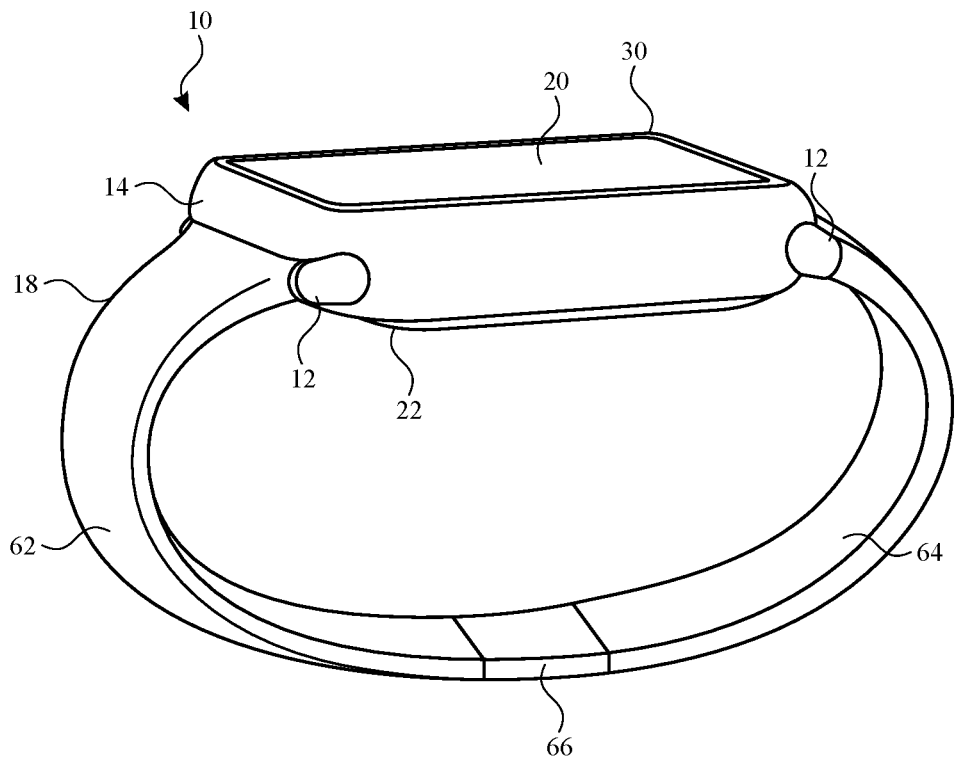
FIG. 1 is a perspective view of a watch, in accordance with some embodiments of the present disclosure.

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, it will be clear and apparent to those skilled in the art that the subject technology is not limited to the specific details set forth herein and may be practiced without these specific details. In some instances, well-known structures and components are shown in block diagram form in order to avoid obscuring the concepts of the subject technology.

Wearable electronic devices, such as watches, can be provided with an attachment system for connecting and releasing a removable module that interfaces with some portion of the electronic device. For example, a watch can include watchbands that connect to a watch housing and secure the watch housing to a wrist of a user. The watchbands engage with a related or corresponding module, recess, aperture, or component of the watch housing.

Attachment systems for such modules are desired to provide secure retention, ease of release, and aesthetic qualities. For example, an attachment system for a watch is desired to retain and selectively release a watchband without adversely affecting look and feel of the watch. As the parts for such a system can be small, precise fabrication with low tolerances are preferred so the parts are responsive to operation by a user.

A button can be provided for retaining and releasing an attachment unit of a watchband from a channel of a watch housing. Where the button is made from multiple parts, the complexity and cost of fabrication can be relatively high. In some designs, the multiple parts of the button must be assembled within the watch housing, which is an additional step that introduces a risk of flawed assembly. The interconnection between parts (e.g., snap fit) can lead to poor performance as actuation of one part can be improperly translated to other parts. Furthermore, the multiple parts can shift relative to each other, such that aesthetic features, such as surface alignment with respect to the watch housing, can be difficult to achieve with precision.

Embodiments of the present disclosure provide a unibody button for retaining and releasing an attachment unit of a watchband from a channel of a watch housing. The button is moveably contained between the watch housing and a rear cover, against which the button is biased. With a unibody construction, the button is able to be made with small tolerances. Fabrication of a small unibody part is more straightforward and less expensive than multiple constituent parts. The total number of parts is reduced, thereby simplifying assembly. By eliminating interfaces between constituent parts of a button, activity (e.g., forces, biasing, and engagement) at one portion of the button translates directly to other portions thereof. Assembly tolerances and subsequent cosmetic variation of the button to the surrounding surfaces are reduced due to elimination of the button assembly requirement.

FIG. 1 illustrates a watch 10 including a watch housing 30 that is useable with an attachment unit 12 of an attachment system according to one or more embodiments of the present disclosure. It will be appreciated that the teachings relating to a watch can be applied to other electronic devices, including wearable and/or portable computing devices. Examples include cell phones, smart phones, tablet computers, laptop computers, timekeeping devices, computerized glasses and other wearable devices navigation devices, sports devices, accessory devices, health-monitoring devices, medical devices, wristbands, bracelets, jewelry, and/or the like.

According to some embodiments, one of the components included in the watch 10 can be one or more I/O systems. For example, the watch 10 can include a touchscreen 20 configured to output various information about the watch 10. The touchscreen 20 of the watch 10 can also be configured to receive input. The watch 10 can also have other input and output mechanisms. For example, the watch 10 can include or interface with one or more buttons, a crown, keys, dials, trackpads, microphones and the like.

The watch 10 can include a watch housing 30 and one or more attachment units 12 capable of being removably coupled to a main body 14 of the watch housing 30. The watch housing 30 serves to surround a peripheral region of the watch 10 as well as support the internal components of the watch 10 in their assembled position. For example, the watch housing 30 encloses and supports various internal components (including for example integrated circuit chips, processors, memory devices and other circuitry) to provide computing and functional operations for the watch 10.

The watch 10 can utilize a watchband 18 for attaching the watch 10 to a wrist. For example, as shown in FIG. 1, the watchband 18 can include a first band strap 62 attached to a first attachment unit 12 of the watch 10 and a second band strap 64 attached to a second attachment unit 12 of the watch 10. In some embodiments, free ends of the first band strap 62 and the second band strap 64 can be configured to be releasably attached or secured to one another using a clasp 66 or other attachment mechanism to form a loop. This loop can then be used to attach the watch 10 to a user's wrist.

Although a single attachment unit 12 is discussed herein, a plurality of attachment units 12 can be coupled to the watch housing 30. When multiple attachment units 12 are used, as shown in FIG. 1, the watch housing 30 can have a band retaining feature (e.g., channel 16, latch, clip, recess, lock or other such coupling node) on a first side and a second side of the main body 14. While the band retaining feature of FIG. 1 is shown as a channel, it will be understood that other retention mechanisms can be applied. The channel 16 on the first side of the main body 14 of the watch housing 30 can receive one of the attachment units 12 and the channel 16 on the second side of the main body 14 of the watch housing 30 can receive another attachment unit 12. The attachment units 12 can have a same or different size and/or shape, wherein the size and/or shape corresponds to a size and/or shape of the respective channel 16.

Figure 2:
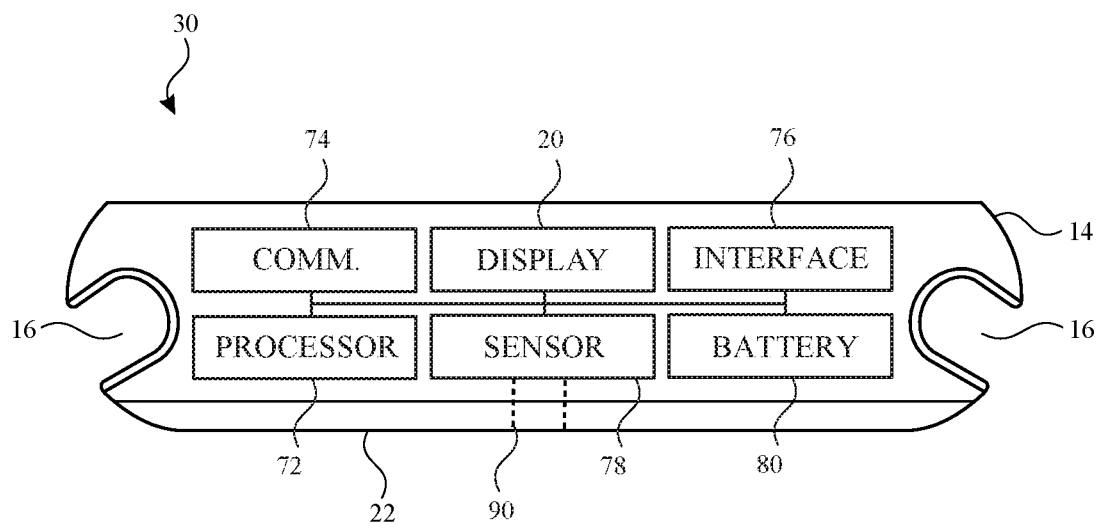
FIG. 2 is a side view of a watch housing, in accordance with some embodiments of the present disclosure.

According to some embodiments, for example as shown in FIG. 2, the main body 14 includes one or more channels 16 that mechanically engage a corresponding attachment unit 12. The channels 16 on the main body 14 include an opening while the attachment unit 12 includes a lug that fits within the opening. The opening can be configured in a variety of different shapes and orientations. Further, the opening is configured to removably receive the lug such as will be described in detail below.

As further illustrated in FIG. 2, the watch 10 can include components for performing various functions, including interacting with a user. For example, the watch 10 can include components for interacting with a user. The touchscreen 20 can provide visual (e.g., image or video) output for the watch 10. The touchscreen 20 may also provide an input surface for one or more touch input devices such as a touch sensing device, force sensing device, temperature sensing device, and/or a fingerprint sensor. The touchscreen 20 may be any size suitable for inclusion at least partially within the housing of the watch 10 and may be positioned substantially anywhere on the watch 10.

The watch 10 can further include one or more other user interfaces 76 for receiving input from and/or providing output to a user. For example, one or more buttons, dials, crowns, switches, or other devices can be provided for receiving input from a user. The user interface 76 can include a speaker, a microphone, and/or a haptic device. A haptic device can be implemented as any suitable device configured to provide force feedback, vibratory feedback, tactile sensations, and the like. For example, in one embodiment, the haptic device may be implemented as a linear actuator configured to provide a punctuated haptic feedback, such as a tap or a knock.

As further shown in FIG. 2, the watch 10 includes one or more processing units 72 that include or are configured to access a memory having instructions stored thereon. The instructions or computer programs may be configured to perform one or more of the operations or functions described with respect to the watch 10. The processing units 72 can be implemented as any electronic device capable of processing, receiving, or transmitting data or instructions. For example, the processing units 72 may include one or more of: a microprocessor, a central processing unit (CPU), an application-specific integrated circuit (ASIC), a digital signal processor (DSP), or combinations of such devices. As described herein, the term "processor" is meant to encompass a single processor or processing unit, multiple processors, multiple processing units, or other suitably configured computing element or elements. The memory can store electronic data that can be used by the watch 10. For example, a memory can store electrical data or content such as, for example, audio and video files, documents and applications, device settings and user preferences, timing and control signals or data for the various modules, data structures or databases, and so on. The memory can be configured as any type of memory. By way of example only, the memory can be implemented as random access memory, read-only memory, Flash memory, removable memory, or other types of storage elements, or combinations of such devices.

As further shown in FIG. 2, the watch 10 may include a communication component 74 that facilitates transmission of data and/or power to or from other electronic devices across standardized or proprietary protocols. For example, a communication component 74 can transmit electronic signals via a wireless and/or wired network connection. Examples of wireless and wired network connections include, but are not limited to, cellular, Wi-Fi, Bluetooth, infrared, RFID and Ethernet.

As further shown in FIG. 2, the watch 10 may also include one or more sensors 78, such as biosensors, positioned substantially anywhere on the watch 10. The one or more sensors 78 may be configured to sense substantially any type of characteristic such as, but not limited to, images, pressure, light, touch, force, temperature, position, motion, and so on. For example, the sensor(s) 78 may be a photodetector, a temperature sensor, a light or optical sensor, an atmospheric pressure sensor, a humidity sensor, a magnet, a gyroscope, an accelerometer, and so on. In other examples, the watch 10 may include one or more health sensors. In some examples, the health sensors can be disposed on a bottom surface of the housing of the watch 10, such as near the rear cover 22. The one or more sensors 78 can include optical and/or electronic biometric sensors that may be used to compute one or more biometric characteristic. A sensor 78 can include a light source and a photodetector to form a photoplethysmography (PPG) sensor. Light can be transmitted from the sensor 78, to the user, and back to the sensor 78. For example, the main body 14 and/or the rear cover 22 can provide one or more windows 90 (e.g., opening, transmission medium, and/or lens) to transmit light to and/or from the sensor 78. The optical (e.g., PPG) sensor or sensors may be used to compute various biometric characteristic including, without limitation, a heart rate, a respiration rate, blood oxygenation level, a blood volume estimate, blood pressure, or a combination thereof. One or more of the sensors 78 may also be configured to perform an electrical measurement using one or more electrodes. The electrical sensor(s) may be used to measure electrocardiographic (ECG) characteristics, galvanic skin resistance, and other electrical properties of the user's body. Additionally or alternatively, a sensor 78 can be configured to measure body temperature, exposure to UV radiation, and other health-related information.

As further shown in FIG. 2, the watch 10 may include a battery 80 that is used to store and provide power to the other components of the watch 10. The battery 80 may be a rechargeable power supply that is configured to provide power to the watch 10. The watch 10 may also be configured to recharge the battery 80 using a wireless charging system.

Figure 3:
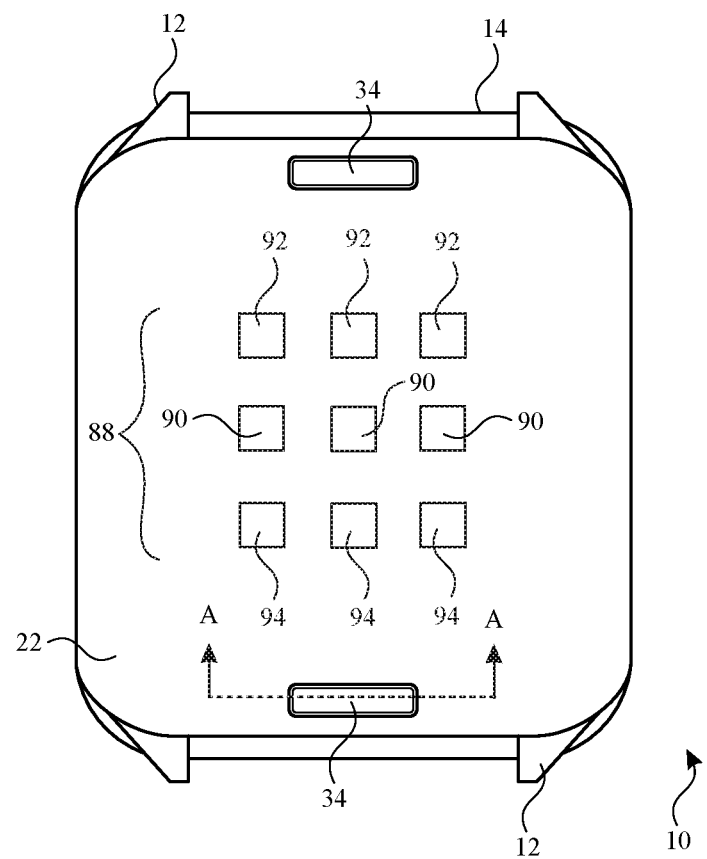
FIG. 3 is a rear view of a watch housing, in accordance with some embodiments of the present disclosure.

FIG. 3 illustrates a bottom view of the watch 10 of FIG. 1 according to one or more embodiments of the present disclosure. A rear cover 22 or multiple rear covers can be provided over a portion of the main body 14. The button 34 can be disposed on an underside of the main body 14. Alternatively or additionally, the button 34 can be disposed or positioned on a top side of the main body 14. The rear cover 22 can surround at least a portion of one or more buttons 34. According to some embodiments, the button 34 can be used to release a locking mechanism of the attachment unit 12 from the channel 16. Actuation of the button 34 releases the attachment unit 12, which enables the attachment unit 12 to be removed from the channel 16.

The rear cover 22 can cover a substantial portion of the main body 14 of the watch 10. For example, the rear cover 22 can cover a majority of the main body 14 on one side thereof (e.g., more than 50%, 60%, 70%, 80%, or 90% or up to 100% of a surface area on a side of the main body 14). The rear cover 22 can extend approximately from one channel to another channel that are both within the main body 14. The rear cover 22 can provide an entirety of the surface of the housing that is contacted by the wrist of the user when the watch 10 is worn.

The rear cover 22 can include one or more components 88 that provide communication, access, or functions on or through the rear cover 22. The components 88 can include one or more windows 90, one or more electrodes 92, and/or one or more modules 94. While the components 88 of FIG. 3 are represented as squares aligned in a grid pattern, it will be understood that the components 88 can be of any size, shape, and/or arrangement. For example, the components 88 can be square, rectangular, polygonal, round, curved, arcuate, circular, semi-circular, flat, or another shape. The components 88 (e.g., windows 90, electrodes 92, and/or modules 94) can be the same size, different sizes, the same shape, or different shapes. The components 88 (e.g., windows 90, electrodes 92, and/or modules 94) can be distributed in a pattern or another arrangement along the surface of the rear cover 22. At least a pair of the components 88 of one type (e.g., windows 90, electrodes 92, and modules 94) can be separated from each other by components 88 of another type. One or more of the components 88 (e.g., windows 90, electrodes 92, and modules 94) can partially or entirely surround another one or more of the components 88 (e.g., windows 90, electrodes 92, and modules 94). For example, at least some of the electrodes 92 can partially or entirely surround one or more of the windows 90 and/or modules 94. At least some of the windows 90 can partially or entirely surround one or more other windows 90. For example, one or more central windows 90 can be used to transmit light in one direction, and other surrounding windows 90 can be used to transmit light in another direction. Additionally or alternatively, the windows 90 can partially or entirely surround one or more of the electrodes 92 and/or modules 94. The components 88 can extend along an inner and/or outer surface of the rear cover 22 and/or extend into or through the width of the rear cover 22 (e.g., between and to opposing sides of the rear cover 22).

The rear cover 22 can provide one or more windows 90 forming optical pathways to transmit light to and/or from a sensor within the main body 14. With light transmitted through the windows 90, an optical (e.g., PPG) sensor or sensors can be used to compute various biometric characteristics including, without limitation, a heart rate, a respiration rate, blood oxygenation level, a blood volume estimate, blood pressure, or a combination thereof. The windows 90 can form an opening, a transmission medium, an optical filter, and/or a lens. It will be appreciated that any number of windows 90 can be provided. One or more windows 90 can provide transmission of light from a light-emitting device within the main body 14. One or more windows 90 can provide transmission of light to a light-detecting device (e.g., sensor) within the main body 14. The windows 90 can be of any size, shape, and arrangement. For example, the windows 90 can be arranged to align with a sensor and/or a target region or regions of the user when the watch is worn by the user.

The rear cover 22 can provide one or more electrodes 92 to provide an electrically conductive pathway through or along the rear cover 22. The electrodes 92 can be operated to perform an electrical measurement, for example, to measure electrocardiographic (ECG) characteristics, galvanic skin resistance, and other electrical properties of the user's body and/or the environment. It will be appreciated that any number of electrodes 92 can be provided. Each electrode 92 can be insulated from other electrodes 92 and/or other components of the watch. One or more electrodes 92 can operate as a first terminal, and one or more electrodes 92 can operate as an additional terminal. The electrodes 92 can be of any size, shape, and arrangement. For example, the electrodes 92 can be arranged to align with a target region or regions of the user when the watch is worn by the user.

The rear cover 22 can provide one or more modules 94 providing additional functionality. The one or more modules 94 can provide of facilitate measurements of body temperature, exposure to UV radiation, and other health-related information. The one or more modules 94 can provide of facilitate measurements of body temperature, exposure to UV radiation, and other health-related information. The one or more modules 94 can be configured to provide or facilitate detection of images, pressure, light, touch, force, temperature, position, motion, and so on. The one or more modules 94 can include or facilitate operation of a temperature sensor, a light or optical sensor, an atmospheric pressure sensor, a humidity sensor, a magnet, a gyroscope, an accelerometer, and so on. The one or more modules 94 can include an opening extending partially or entirely through the rear cover 22 to provide exposure to an external environment, for example, for measurements.

Figure 4:
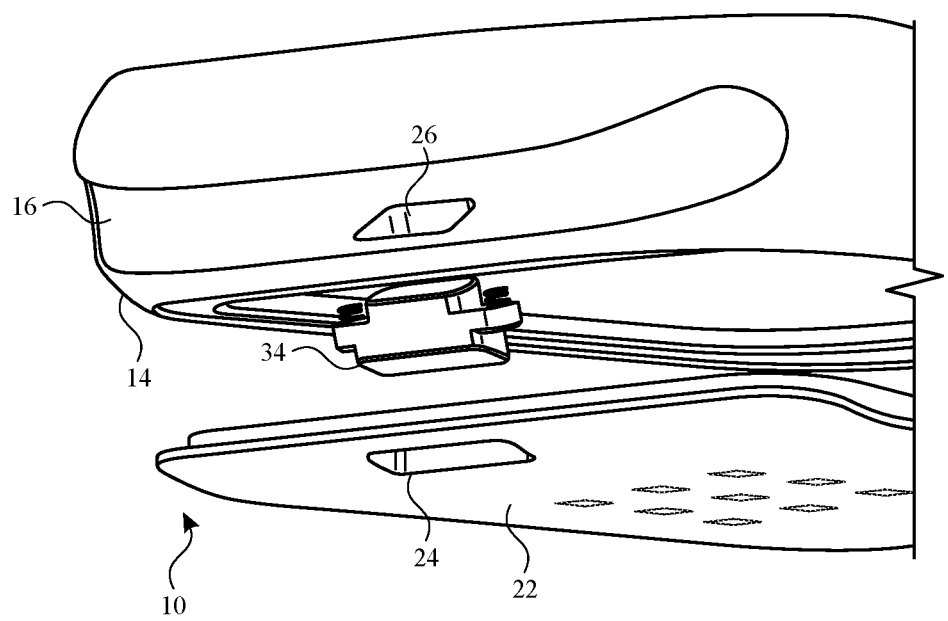
FIG. 4 is an exploded perspective view of a watch housing, in accordance with some embodiments of the present disclosure.

FIG. 4 illustrates an exploded perspective view of the watch 10 of FIG. 1 according to one or more embodiments of the present disclosure. The button 34 can be positioned between the rear cover 22 and the main body 14. By providing the rear cover 22 and the main body 14 on opposite sides of the button 34, the watch 10 can be assembled to contain the button 34. As such, the button 34 can be a unibody structure, rather than an assembly of parts that are assembled within the watch 10. As used herein, a unibody structure is one that is integrally formed of a single piece. For example, the button 34 can be a monolithic structure. By providing a unibody button 34, the button 34 does not contain dimensional variations that occur in assembled parts. Accordingly, the unibody button 34 can be fabricated to more precise and consistent dimensions. This allows the unibody button 34 to more accurately match the dimensions of the main body 14 and the rear cover 22 into which the unibody button 34 is placed.

According to some embodiments, the button 34 is aligned with a housing opening 26 of the main body 14. The housing opening 26 extends through the main body 14 at least to the channels 16. In some embodiments, the housing opening 26 is positioned within the channel 16 such that the locking mechanism of the attachment unit 12 is aligned with the housing opening 26 when the sides of the attachment unit 12 are flush or substantially flush with respect to the channel 16 and/or one or more sidewalls of the main body 14. For example, the channel 16 of the main body 14 is configured to receive either a proximal end or a distal end of the attachment unit 12. Once either the proximal end or the distal end of the attachment unit 12 has been received by the channel 16, the attachment unit 12 can slide or move within the channel 16 until the locking mechanism of the attachment unit 12 expands into, engages with, or otherwise enters the housing opening 26 contained within the main body 14.

According to some embodiments, the button 34 is aligned with a cover opening 24 of the rear cover 22. The cover opening 24 extends through the rear cover 22 to opposite surfaces thereof. The rear cover 22 can be placed on the main body 14 so that the button 34 is secured within the housing opening 26 and the cover opening 24. The user can access the button 34 at the cover opening 24 of the rear cover 22. The button 34 can be movable through at least part of the cover opening 24 and the housing opening 26 while the rear cover 22 is affixed to the main body 14.

The housing opening 26 and the cover opening 24 can provide one or more of a variety of shapes and sizes to accommodate portions of the button 34. For example, the shape and/or size of the housing opening 26 and the cover opening 24 can complement corresponding portions of the button 34. The housing opening 26 and/or the cover opening 24 can have a cross-sectional shape that is round, rectangular, oval, oblong, lozenge-shaped, and/or polygonal. The housing opening 26 and the cover opening 24 can have the same or different shapes and/or sizes. According to some embodiments, the cover opening 24 is larger than the housing opening 26 to accommodate a fingernail and/or tool to actuate the button 34. Separate housing openings 26 of a given main body 14 can have the same or different shapes and/or sizes. Separate cover openings 24 of a given rear cover 22 can have the same or different shapes and/or sizes. For any given housing opening 26 or cover opening 24, the cross-sectional shape and/or size can be the same or vary along the depth thereof.

Figure 5:
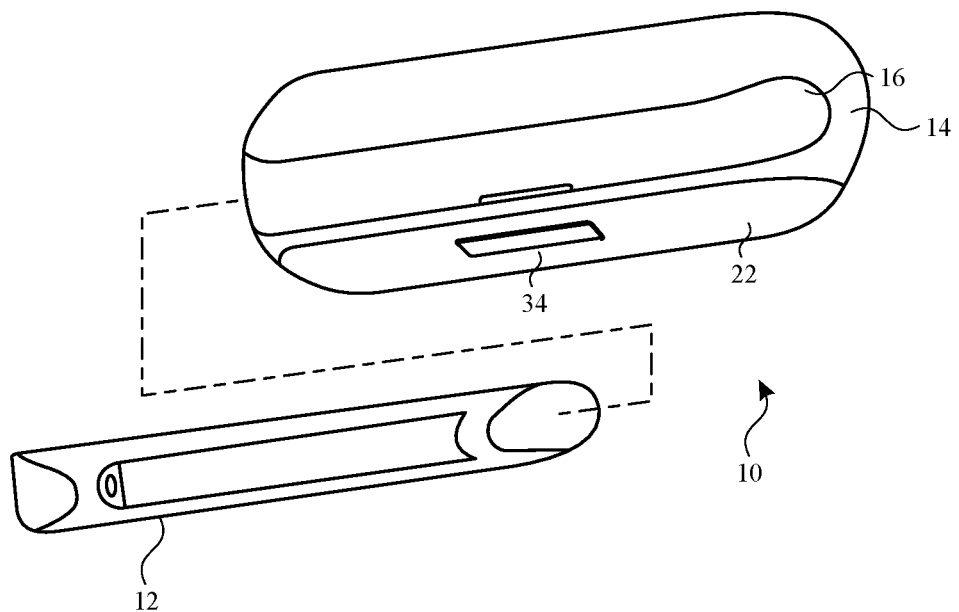
FIG. 5 is a perspective view of a watch housing and a watchband connector, in accordance with some embodiments of the present disclosure.

According to some embodiments, for example as shown in FIG. 5, the attachment unit 12 can be laterally inserted into the main body 14 of the watch 10. As such, the attachment unit 12 can be configured to slide relative to the main body 14 of the watch 10. Alternatively or additionally, the attachment unit 12 can be pressed, snap fit or otherwise forwardly inserted into the channel 16 of the main body 14. Once inserted, the attachment unit 12 can be locked or otherwise secured within the main body 14. For example, a locking mechanism (e.g., a lug) can engage at least the housing opening 26 within the channel 16.

Figure 6:
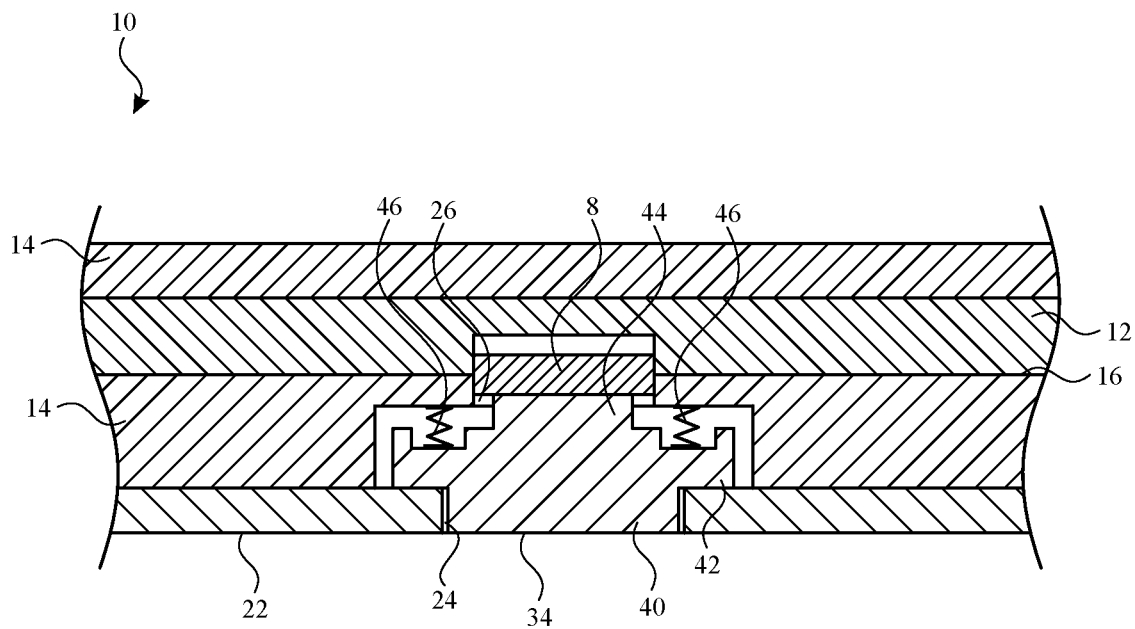
FIG. 6 is a sectional view of a watch housing and a watchband connector of the section A-A of FIG. 3, in accordance with some embodiments of the present disclosure.

FIG. 6 illustrates a sectional view of the watch 10 of FIG. 1 according to one or more embodiments of the present disclosure. The attachment unit 12 is shown within a channel 16, which separates portions of the main body 14 from each other. According to some embodiments, for example as shown in FIG. 6, the button is moveably contained between the rear cover 22 and the main body 14, which are coupled to each other. The cover opening 24 of the rear cover 22 is provided across from a housing opening 26 of the main body 14, so that a continuous opening is provided from the channel 16 to an outer surface of the rear cover 22. A locking mechanism (e.g., lug 8) of the attachment unit 12 engages within the housing opening 26 when aligned therewith. In this position, the attachment unit 12 is unable to move within or be removed from the channel 16 until the lug 8 is released form the housing opening 26.

According to some embodiments, the button 34 comprises various regions. The regions of the button 34 are not distinctly separable, but rather regions of the unibody structure. The button 34 includes a rear portion 40 that can extend at least partially through the cover opening 24. The rear portion 40 can be accessed by a user for actuation. In a rest position (e.g., when not actuated by a user), the rear portion 40 can be flush with a surface of the rear cover 22. The rear portion 40 can form a spline within the rear cover 22 so that the surface of the rear portion 40 is continuous with the surface of the rear cover 22. The rear portion 40 has a contour that matches a contour of the surface of the rear cover 22. The button 34 further includes a channel portion 44 that can extend at least partially through the housing opening 26. The channel portion 44 can engage the lug 8 of the attachment unit 12 when the button 34 is actuated. Between the rear portion 40 and the channel portion 44, the button 34 includes a flange 42 for engaging other structures.

According to some embodiments, the rear portion 40 of the button 34 can include or be coupled to a cap (not shown). The cap can be of a different material and/or have a cosmetic feature that is different than that of the rear portion 40. For example, the cap can cosmetically match a surface of the rear cover 22. At least some of the cap extends outwardly toward or through the cover opening 24.

The button 34 is biased to a rest position. According to some embodiments, the button 34 is biased so that the flange 42 is pressed against the rear cover 22. One or more spring elements 46 can be provided between the button 34 (e.g., the flange 42) and the main body 14. According to some embodiments, the spring elements 46 can include a coil spring, a compression spring, a leaf spring, a torsion spring, cantilever spring, or a structure of an elastic material.

The spring elements can bias the button 34 into the cover opening 24 or against the rear cover 22. The spring elements 46 can also bias the button 34 away from the main body 14, the housing opening 26, and/or the lug 8 of the attachment unit 12. The spring elements 46 apply a force to the button 34 at least when the button 34 is depressed by a user. The force can be normal to the cover opening 24, so that the button 34 is radially aligned within the cover opening 24, rather than deflected to one side thereof. The spring elements 46 can continue to apply a force to the button 34 when not depressed, so the button is maintained away from the lug 8. Because the button 34 is a unibody structure, the position of every part of the button 34 is predictable when the spring elements 46 acts presses the flange 42 against the rear cover 22. For example, the movement and position of the flange 42 is controlled based on the bias of the spring elements 46 and the limit provided by the rear cover 22. Accordingly, the rear portion 40 and the channel portion 44 are moved and positioned in direct relation to the flange 42 where all parts are of a unibody structure. With this result, the entire button 34 can be sized and shaped to fit relative to the main body 14 and the rear cover 22 with lower tolerances than would be required with buttons of multiple assembled parts.

Figure 7:
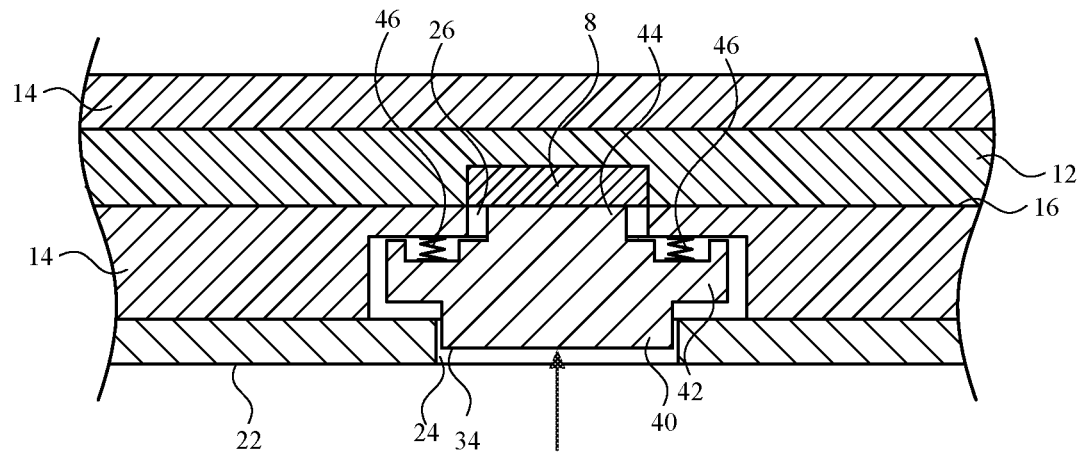
FIG. 7 is a sectional view of the watch housing and the watchband connector of FIG. 6, in accordance with some embodiments of the present disclosure.
Figure 8:
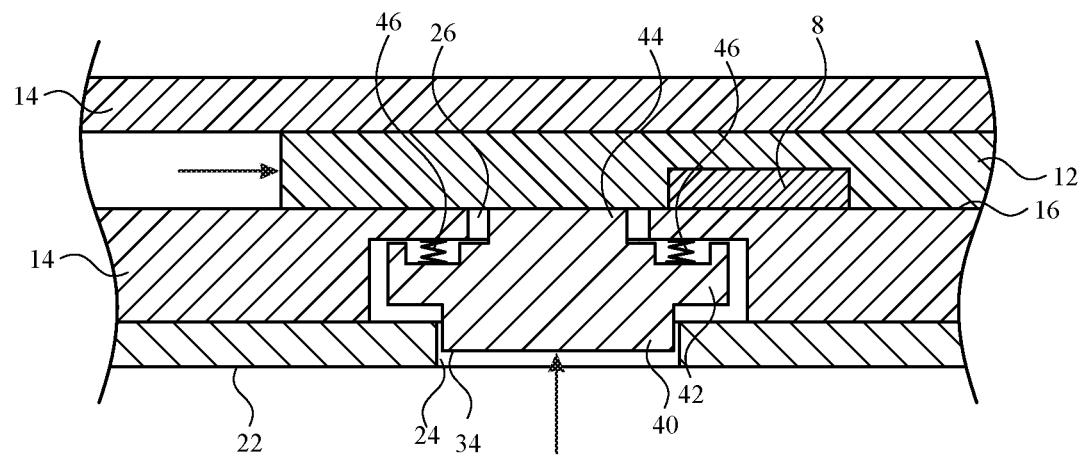
FIG. 8 is a sectional view of the watch housing and the watchband connector of FIG. 6, in accordance with some embodiments of the present disclosure.

FIG. 7 illustrates a sectional view of the watch 10 of FIG. 6 with the button actuated by a user according to one or more embodiments of the present disclosure. To release the attachment unit 12 from the channel 16, the button 34 is actuated. When actuated, the button 34 can move so that the channel portion 44 of the button 34 moves towards and partially through the housing opening 26. Actuation of the button 34 expels the lug 8 from the housing opening 26. As shown in FIG. 8, this also enables the attachment unit 12 to once again freely move or slide within the channel 16 of the main body 14 or be pulled out from the front face of the channel 16. For example, when actuated, the button 34 can move so that the channel portion 44 is flush with a surface of the channel 16. The channel portion 44 can form a spline within the main body 14 so that the surface of the channel portion 44 is continuous with the surface of the channel 16. The channel portion 44 has a contour that matches a contour of the surface of the channel 16. When released, the button 34 can return to the rest position by action of the spring elements 46.

Figure 9:
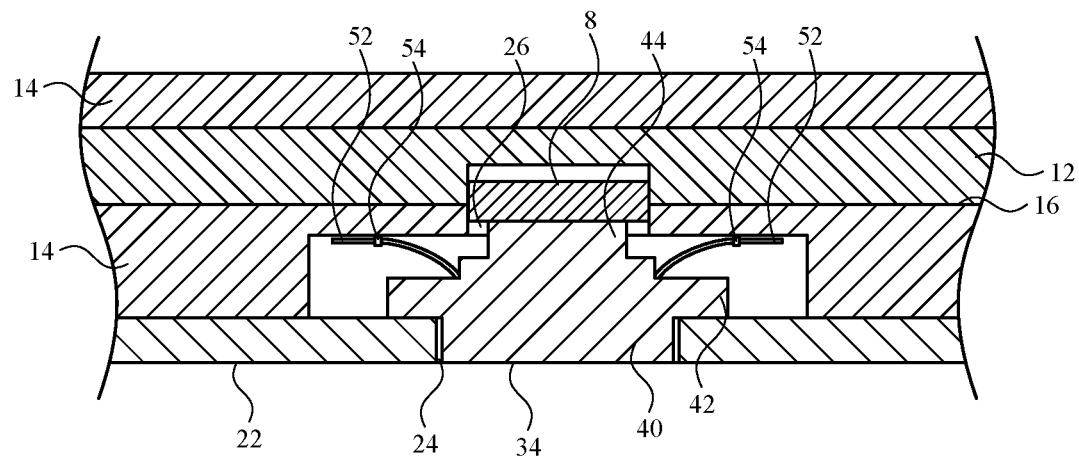
FIG. 9 is a sectional view of a watch housing and a watchband connector, in accordance with some embodiments of the present disclosure.

According to some embodiments, for example as shown in FIG. 9, the button 34 is biased with one or more of a variety of spring elements. For example, one or more extension arms 52 can extend from the button 34 toward the main body 14. The extension arms 52 can be parts of a continuous structure. The extension arms 52 can be integrated into the button 34, for example by welding or overmolding. Each of the extension arms 52 is fixed a corresponding retention member 54 that is attached to the main body 14. The extension arms 52 can be resilient, so that they tend to push against the retention members 54 and bias the button 34 against the rear cover 22.

Other configurations for biasing the button 34 against the rear cover 22 are contemplated. For example, the button 34 can be biased against the rear cover 22 with a spring element that is connected to the button 34 and the rear cover 22. The spring element can include a tension spring between the button 34 and the rear cover 22 that stretches when the button is depressed and applies a tension force on the button to bias it against the rear cover 22. The spring element need not between the button 34 and the rear cover 22. For example, the spring element can connect a side of the button 34 facing the channel 16 with a portion of the rear cover 22 that is outside the periphery of the button 34.

Figure 10:
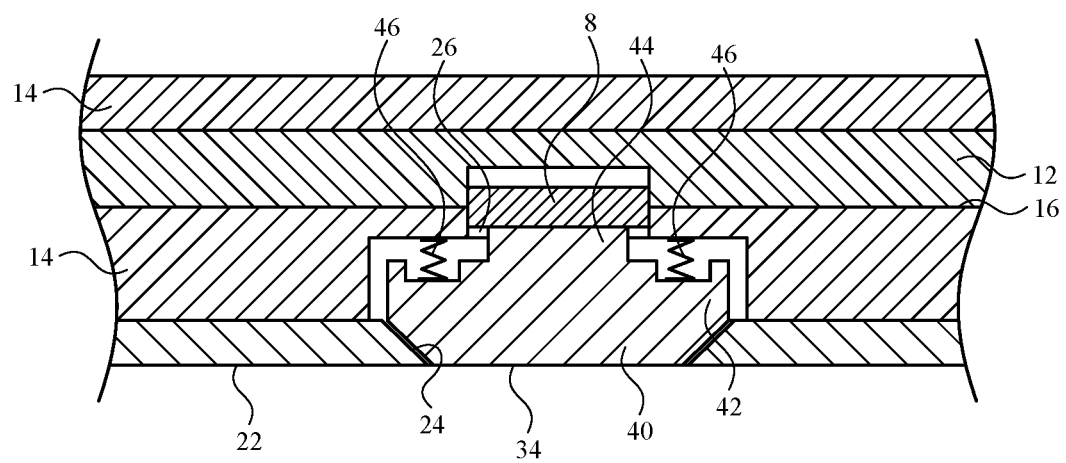
FIG. 10 is a sectional view of a watch housing and a watchband connector, in accordance with some embodiments of the present disclosure.

According to some embodiments, for example as shown in FIG. 10, the button 34 and the cover opening 24 have complementary shapes that facilitate radial alignment of the button within the cover opening 24. As shown in FIG. 10, the rear portion 40 of the button 34 can have a tapered cross-sectional dimension along a depth thereof. The cover opening 24 can also have a tapered cross-sectional dimension along a depth thereof. The shape for either can, for example, form a frustrum (e.g., frustoconical, etc.). The shape can be complementary so that the button 34 is radially aligned within the cover opening 24 by moving axially into the cover opening 24. Where radial misalignment occurs, reentry into the cover opening 24 can restore proper alignment. Furthermore, engagement between the button 34 and the cover opening 24 can occur when a surface of the button 34 is flush with a surface of the rear cover 22.

Accordingly, embodiments of the present disclosure provide a button (e.g., unibody button) for retaining and releasing an attachment unit of a watchband from a channel of a watch housing. The button is moveably contained between the watch housing and a rear cover, against which the button is biased. With a unibody construction, the button is able to be made with small tolerances. Fabrication of a small unibody part is more straightforward and less expensive than multiple constituent parts. The total number of parts is reduced, thereby simplifying assembly. By eliminating interfaces between constituent parts of a button, activity (e.g., forces, biasing, and engagement) at one portion of the button translates directly to other portions thereof. Assembly tolerances and subsequent cosmetic variation of the button to the surrounding surfaces are reduced due to elimination of the button assembly requirement.

A reference to an element in the singular is not intended to mean one and only one unless specifically so stated, but rather one or more. For example, "a" module may refer to one or more modules. An element proceeded by "a," "an," "the," or "said" does not, without further constraints, preclude the existence of additional same elements.

Headings and subheadings, if any, are used for convenience only and do not limit the invention. The word exemplary is used to mean serving as an example or illustration. To the extent that the term include, have, or the like is used, such term is intended to be inclusive in a manner similar to the term comprise as comprise is interpreted when employed as a transitional word in a claim. Relational terms such as first and second and the like may be used to distinguish one entity or action from another without necessarily requiring or implying any actual such relationship or order between such entities or actions.

Phrases such as an aspect, the aspect, another aspect, some aspects, one or more aspects, an implementation, the implementation, another implementation, some implementations, one or more implementations, an embodiment, the embodiment, another embodiment, some embodiments, one or more embodiments, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

A phrase "at least one of" preceding a series of items, with the terms "and" or "or" to separate any of the items, modifies the list as a whole, rather than each member of the list. The phrase "at least one of" does not require selection of at least one item; rather, the phrase allows a meaning that includes at least one of any one of the items, and/or at least one of any combination of the items, and/or at least one of each of the items. By way of example, each of the phrases "at least one of A, B, and C" or "at least one of A, B, or C" refers to only A, only B, or only C; any combination of A, B, and C; and/or at least one of each of A, B, and C.

It is understood that the specific order or hierarchy of steps, operations, or processes disclosed is an illustration of exemplary approaches. Unless explicitly stated otherwise, it is understood that the specific order or hierarchy of steps, operations, or processes may be performed in different order. Some of the steps, operations, or processes may be performed simultaneously. The accompanying method claims, if any, present elements of the various steps, operations or processes in a sample order, and are not meant to be limited to the specific order or hierarchy presented. These may be performed in serial, linearly, in parallel or in different order. It should be understood that the described instructions, operations, and systems can generally be integrated together in a single software/hardware product or packaged into multiple software/hardware products.

In one aspect, a term coupled or the like may refer to being directly coupled. In another aspect, a term coupled or the like may refer to being indirectly coupled.

Terms such as top, bottom, front, rear, side, horizontal, vertical, and the like refer to an arbitrary frame of reference, rather than to the ordinary gravitational frame of reference. Thus, such a term may extend upwardly, downwardly, diagonally, or horizontally in a gravitational frame of reference.

The disclosure is provided to enable any person skilled in the art to practice the various aspects described herein. In some instances, well-known structures and components are shown in block diagram form in order to avoid obscuring the concepts of the subject technology. The disclosure provides various examples of the subject technology, and the subject technology is not limited to these examples. Various modifications to these aspects will be readily apparent to those skilled in the art, and the principles described herein may be applied to other aspects.

All structural and functional equivalents to the elements of the various aspects described throughout the disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for".

The title, background, brief description of the drawings, abstract, and drawings are hereby incorporated into the disclosure and are provided as illustrative examples of the disclosure, not as restrictive descriptions. It is submitted with the understanding that they will not be used to limit the scope or meaning of the claims. In addition, in the detailed description, it can be seen that the description provides illustrative examples and the various features are grouped together in various implementations for the purpose of streamlining the disclosure. The method of disclosure is not to be interpreted as reflecting an intention that the claimed subject matter requires more features than are expressly recited in each claim. Rather, as the claims reflect, inventive subject matter lies in less than all features of a single disclosed configuration or operation. The claims are hereby incorporated into the detailed description, with each claim standing on its own as a separately claimed subject matter.

The claims are not intended to be limited to the aspects described herein, but are to be accorded the full scope consistent with the language of the claims and to encompass all legal equivalents. Notwithstanding, none of the claims are intended to embrace subject matter that fails to satisfy the requirements of the applicable patent law, nor should they be interpreted in such a way.

What is claimed is:

1. A watch housing comprising:
    a main body having a first opening and a band retaining feature for receiving a watchband;
    a rear cover having a second opening;
    a button comprising a flange and extending at least partially through the first opening and second opening, wherein the flange is between a first end of the button and a second end of the button and the button is moveable between a first position with the first end entirely within the first opening and a second position with the second end entirely within the second opening; and
    a spring element between the flange and the main body, wherein the spring element is configured to bias an entirety of the button away from an entirety of the watchband.

2. The watch housing of claim 1, further comprising:
    a touchscreen configured to display a visual output to a user and receive touch input from a user;
    a microphone;
    a speaker;
    a communication component for communicating wirelessly with another device; and
    a sensor configured to detect a characteristic of a user through the rear cover.

3. The watch housing of claim 1, further comprising:
    a photoplethysmography sensor comprising a light source and a photodetector, wherein the rear cover includes a first window for transmitting light from the light source and a second window for transmitting light to the photodetector.

4. The watch housing of claim 1, further comprising: a sensor configured to detect electrocardiographic (ECG) characteristics of a user, wherein the rear cover includes an electrode operably connected to the sensor.

5. The watch housing of claim 1, wherein the first opening and the second opening are connected to form a continuous space within the watch housing.

6. The watch housing of claim 1, wherein the button is accessible by a user through the second opening.

7. A watch housing comprising:
a main body having a first band retaining feature on a first side of the main body for receiving a first watchband portion and a second band retaining feature on a second side of the main body, opposite the first side, for receiving a second watchband portion;
a rear cover attached to the main body and extending continuously from the first side of the main body to the second side of the main body;
a first button having a first flange between the main body and the rear cover, wherein the first button is biased toward the rear cover and away from an entirety of the first band retaining feature, wherein when the first button is depressed it releases the first watchband portion from the first band retaining feature while the first flange abuts the main body, and wherein movement of the first button away from the first band retaining feature is limited by contact between the first flange and the main body, and
a second button having a second flange between the main body and the rear cover, wherein the second button is biased toward the rear cover and away from an entirety of the second band retaining feature, wherein when the second button is depressed it releases the second watchband portion from the second band retaining feature while the second flange abuts the main body, and wherein movement of the second button away from the second band retaining feature is limited by contact between the first flange and the main body.

8. The watch housing of claim 7, further comprising a sensor configured to sense a heart rate of a user through the rear cover.

9. The watch housing of claim 7, further comprising a sensor configured to detect electrocardiographic (ECG) characteristics of a user, wherein the rear cover includes an electrode operably connected to the sensor.

10. The watch housing of claim 7, wherein the first button is biased to a rest position in which the first button rests against the rear cover.

11. The watch housing of claim 10, wherein the first button, while in the rest position, has a surface that is flush and continuous with a surface of the rear cover.

12. The watch housing of claim 7, wherein the first band retaining feature comprises a channel and the first button is moveable toward the channel until a surface of the first button is flush and continuous with a surface of the channel.

13. The watch housing of claim 7, wherein when the first button is depressed it actuates a portion of the first watchband portion that interacts with the watch housing.

14. The watch housing of claim 7, wherein movement of the first button away from the first band retaining feature is limited by the rear cover.

15. A watch housing comprising:
a main body having a channel for receiving a watchband and a first opening extending to the channel;
a rear cover having a second opening;
a button comprising a first terminal end portion extending at least partially through the first opening, a second terminal end portion extending at least partially through the second opening, and a flange between the first terminal end portion and the second terminal end portion; and
a spring element between the flange and the main body, wherein the spring element biases the flange against the rear cover, wherein the button is depressable away from the rear cover to release the watchband from the channel, wherein the button is moveable between a first position with the first terminal end portion flush with the channel and a second position with the second terminal end portion flush with a surface of the rear cover.

16. The watch housing of claim 15, wherein:
the rear cover is coupled to the main body;
the first opening and the second opening are connected to form a continuous space within the watch housing;
the flange has a cross-sectional dimension that is larger than the first opening and the second opening; and
the first terminal end portion of the button forms a first spline within the first opening and the second terminal end portion of the button forms a second spline within the second opening.

17. The watch housing of claim 15, wherein the watch housing contains a sensor and the rear cover comprises a window for transmitting light to or from the sensor.

18. The watch housing of claim 15, wherein the spring element comprises a resilient arm that extends from the button to a retention member attached to the main body.

* * * * *